M. BARTHOLDY.
SURFACE GAUGE.
APPLICATION FILED NOV. 6, 1920.
1,404,425. Patented Jan. 24, 1922.
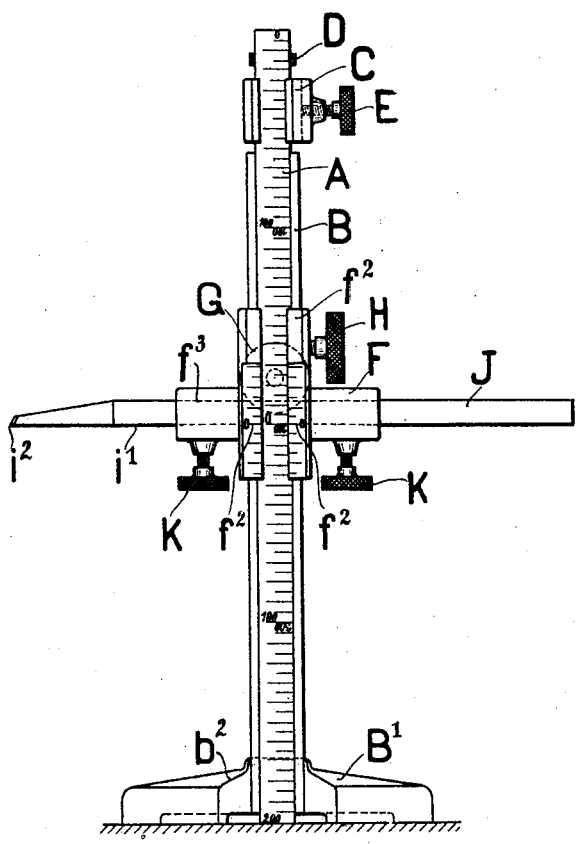
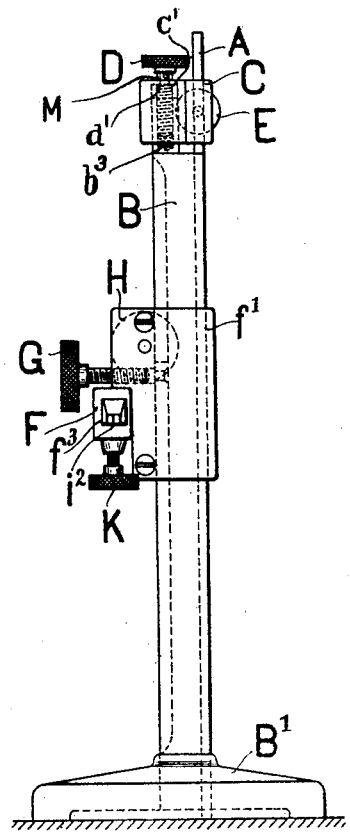
Inventor
Max Bartholdy
By Knight Bros
Attys

UNITED STATES PATENT OFFICE.

MAX BARTHOLDY, OF KARLSKOGA, SWEDEN, ASSIGNOR TO FRIED. KRUPP AKTIENGESELLSCHAFT, OF ESSEN-ON-THE-RUHR, GERMANY.

SURFACE GAUGE.

1,404,425.   Specification of Letters Patent.   Patented Jan. 24, 1922.

Application filed November 6, 1920. Serial No. 422,371.

*To all whom it may concern:*

Be it known that I, MAX BARTHOLDY, residing at Karlskoga, Sweden, a citizen of the German Republic, have invented a certain new and useful Improvement in Surface Gauges, for which I have filed application in Germany, Aug. 14, 1919, of which the following is a specification.

This invention relates to surface gauges of the kind provided with an adjustable graduated bar and comprises a device affording the possibility of adjusting the zero mark of the graduated bar in accordance with the reading mark of the tracer holder, while the tracer for its part may be adjusted to any desired height.

An embodiment of the subject matter of the invention is disclosed in the annexed drawing, in which—

Fig. 1 is a front view and

Fig. 2 a side view of the improved surface gauge.

The graduated bar A is adapted to be longitudinally displaced within a longitudinal groove formed in the column B of the standard of the gauge consisting of this column and a flat base plate $B^1$. The said graduated bar A is provided with a plurality of zero points, of which one is located at one end of the bar, while the remainder are disposed at various heights intermediate the two ends thereof. Only two such zero points are shown in the drawing, of which the one, in the position assumed by the bar according to Fig. 1, is located on top, whereas the other is in the middle. The figures proceeding from these two zero points are disposed in vertically aligned inversely arranged columns relatively to each other (cf. Fig. 1) so that there is no possibility of the wrong column of figures, i. e., the one not required for the time being, coming to be read by mistake. On the column B of the standard B, $B^1$ is further arranged a slide member C, adapted to be raised or lowered for a slight extent by means of a set screw D. This set screw D engages a corresponding thread in an extension $b^3$ of the column B. A collar $c'$ on the slide member C lies between shoulder $d'$ of the set screw D and a sleeve M, which is interposed between the head of the set screw D and the slide member C. Consequently when the set screw D is turned, the slide member C is moved up or down. The graduated bar A is likewise guided within the slide member C and can be secured thereon and therefore with respect to the column B, by means of a clamping screw E. In order that the bottom end of the graduated bar A may be lowered into the very base face of the standard, the base plate $B^1$ is suitably cut. The opening thus formed is preferably shaped to constitute a recess $b^2$ open toward the periphery, in consequence of which the graduated bar A may be used to gauge the height of even very small surfaces. The tracer holder F is, for its part, also adapted to slide by means of a guide $f^1$ along the column B, a clamping screw G serving to secure it in any position assumed. On its front side the tracer holder F, which may be held in its exact adjustment by means of a small milled wheel H, has a vernier $f^2$, the zero point of which forms the reading mark of the instrument.

The tracer J is longitudinally displaceable within the holder F in a guide $f^3$ which forms an invariable angle of 90° with the guide $f^1$. By means of two clamping screws K the tracer is adapted to be secured to the holder F and is of a substantially square shape, its one side face $i^1$ lying parallel to the bottom surface of the base plate $B^1$. The point $i^2$ of the tracer is situated in the plane $i^1$, which when the tracer is re-ground remains unchanged. As a result, the point $i^2$ of the tracer remains always located at the same height relatively to the holder F, the arrangement devised being in this respect such that the zero point $f^2$ of the vernier will at the same time be disposed at the same height. It consequently follows that, when the zero point of the graduated bar A coincides with the base surface of the instrument, the point $i^2$ of the tracer will always be accurately disposed at the height indicated by the vernier, and this owing to the parallelism existing between the tracer guide $f^3$ and the base surface of the gauge, regardless of how far the tracer J happens to project beyond the holder F.

The hereinbefore-described surface-gauge will prove specially useful in such cases where, as frequently happens, the zero plane of the measurement is disposed in parallel to an even surface of the piece to be worked with which surface this latter may be placed on the surface plate. In this case, the manner of operation is as follows:

The graduated bar A is so passed through the guide of the slide C and of the column B of the standard B, B¹ placed on the surface plate, that the zero point arranged at one end of said bar will come to be lodged at bottom, whereupon the bar is adjusted until this particular end thereof abuts against the surface plate. When in this position, the bar is secured to the column B by means of the clamping screw E. Upon this, by duly shifting the tracer holder F, the amount indicated by the working drawing and indicating the height of the zero plane is adjusted by means of the vernier $f^2$ on the bar whereupon the tracer holder F is fixed to the column B by means of the clamping screw G, and the zero mark indicating the zero plane of the measurement is traced on the piece to be worked by means of the point $i^2$ of the tracer. After this, the bar A is adjusted, firstly by hand and then, after the screw E has been tightened, by means of the set screw D, with a suitable one of its zero points to register with the zero point of the vernier $f^2$ which point lies at the height of the zero mark traced immediately before on the piece to be worked. This done, the clamping screw G of the tracer holder F is loosened, and this latter adjusted relatively to the graduated bar now fixed in its position, and with aid of the vernier $f^2$ to the measures indicated by the working drawing and referring to the zero-plane of the measurement, which measures are then finally transferred by the tracer J on to the piece to be worked.

A further advantage of the subject matter of the invention which bases upon the shape of the point $i^2$ of the tracer in connection with the arrangement of the guide $f^3$ for the tracer, resides in the feature that the surface gauge may also be used to gauge the heights of surfaces. In such operation the surface $i^1$ of the tracer J, which is adapted to be applied after the manner of the jaw of a slide caliper, from above on the piece to be worked serves as the touch surface.

Claims.

1. A surface gauge having a standard, a measure bar displaceable with respect to the standard, a tracer likewise displaceable with respect to the standard, means for locking said measure bar and said tracer on said standard independently from each other.

2. A surface gauge having a standard, a measure bar displaceable with respect to the standard, a tracer likewise displaceable with respect to the standard and having prismatic section, means for locking said measure bar and said tracer on said standard independently from each other, the point of said tracer lying in a boundary face of the tracer constantly parallel to the base face of said standard.

3. A surface gauge having a standard, a measure bar displaceable with respect to the standard, a tracer likewise displaceable with respect to the standard, means for locking said measure bar and said tracer on said standard independently from each other, said standard having a hole at its lower end enabling the measure bar to pass downwardly through the standard.

4. A surface gauge having a standard, a measure bar displaceable with respect to the standard, a tracer likewise displaceable with respect to the standard and having prismatic section, means for locking said measure bar and said tracer on said standard independently from each other, the point of said tracer lying in a boundary face of the tracer constantly parallel to the base face of said standard, said standard having a hole at its lower end enabling the measure bar to pass downwardly through said standard.

5. A surface gauge having a standard, a measure bar displaceable with respect to the standard, a tracer likewise displaceable with respect to the standard, means for locking said measure bar and said tracer on said standard independently from each other, said measure bar having a scale with two series of indicating figures the zero points of which lie at different points on said bar, said indicating figures being arranged in columns vertically aligned and inversely arranged.

6. A surface gauge having a standard, a measure bar displaceable with respect to the standard, a tracer likewise displaceable with respect to the standard and having prismatic section, means for locking said measure bar and said tracer on said standard independently from each other, the point of said tracer lying in a boundary face of the tracer constantly parallel to the base face of said standard, said measure bar having a scale with two series of indicating figures the zero points of which lie at different points on said bar, said indicating figures being arranged in vertically aligned inversely arranged columns.

7. A surface gauge having a standard, a measure bar displaceable with respect to the standard, a tracer likewise displaceable with respect to the standard, means for locking said measure bar and said tracer on said standard independently from each other, said standard having a hole at its lower end enabling the measure bar to pass downwardly through the standard, said measure bar having a scale with two series of indicating figures the zero points of which lie at different points on said bar, said indicating figures being arranged in vertically aligned inversely arranged columns.

8. A surface gauge having a standard, a measure bar displaceable with respect to the standard, a tracer likewise displaceable with respect to the standard and having prismatic section, means for locking said measure bar and said tracer on said standard independently from each other, the point of said tracer lying in a boundary face of the tracer constantly parallel to the base face of said standard, said standard having a hole at its lower end enabling the measure bar to pass downwardly through said standard, said measure bar having a scale with two series of indicating figures the zero points of which lie at different points on said bar, said indicating figures being arranged in vertically aligned inversely arranged columns.

9. A surface gauge having a standard, a measure bar displaceable with respect to the standard, a tracer likewise displaceable with respect to the standard, means for locking said measure bar and said tracer on said standard independently from each other, said measure bar having at least two scales with indicating figures having a common zero point, one series of said indicating figures running in one direction and the other series running in the other direction from said common zero point.

10. A surface gauge having a standard, a measure bar displaceable with respect to the standard, a tracer likewise displaceable with respect to the standard and having prismatic section, means for locking said measure bar and said tracer on said standard independently from each other, the point of said tracer lying in a boundary face of the tracer constantly parallel to the base face of said standard, said measure bar having at least two scales with indicating figures having a common zero point, one series of said indicating figures running in one direction and the other series running in the other direction from said common zero point.

11. A surface gauge having a standard, a measure bar displaceable with respect to the standard, a tracer likewise displaceable with respect to the standard, means for locking said measure bar and said tracer on said standard independently from each other, said standard having a hole at its lower end enabling the measure bar to pass downwardly through the standard, said measure bar having at least two scales with indicating figures having a common zero point, one series of said indicating figures running in one direction and the other series running in the other direction from said common zero point.

12. A surface gauge having a standard, a measure bar displaceable with respect to the standard, a tracer likewise displaceable with respect to the standard and having prismatic section, means for locking said measure bar and said tracer on said standard independently from each other, the point of said tracer lying in a boundary face of the tracer constantly parallel to the base face of said standard, said standard having a hole at its lower end enabling the measure bar to pass downwardly through said standard, said measure bar having at least two scales with indicating figures having a common zero point, one series of said indicating figures running in one direction and the other series running in the other direction from said common zero point.

The foregoing specification signed at Sweden this 6th day of October, 1920.

MAX BARTHOLDY.

In presence of:
O. A. HERNELL,
G. SJAGIEN.